(12) United States Patent
Petersen et al.

(10) Patent No.: US 8,637,102 B2
(45) Date of Patent: Jan. 28, 2014

(54) ACIDIFIED WHEY PROTEIN COMPOSITIONS AND METHODS FOR MAKING THEM

(75) Inventors: Brent L. Petersen, Twin Falls, ID (US); Eric D. Bastian, Twin Falls, ID (US); Loren Spencer Ward, Twin Falls, ID (US); Starla J. Paulsen, Twin Falls, ID (US); Stanley A. Wrobel, Twin Falls, ID (US); Jessica A. Marshall, Twin Falls, ID (US)

(73) Assignee: Glanbia Nutritionals (Ireland) Ltd., Glanbia House, Kilkenny (IE)

( * ) Notice: Subject to any disclaimer, the term of this patent is extended or adjusted under 35 U.S.C. 154(b) by 628 days.

(21) Appl. No.: 11/328,512

(22) Filed: Jan. 7, 2006

(65) Prior Publication Data

US 2007/0160712 A1 Jul. 12, 2007

(51) Int. Cl.
*A23C 9/12* (2006.01)

(52) U.S. Cl.
USPC .......................................................... 426/36

(58) Field of Classification Search
USPC .......................................................... 426/36
See application file for complete search history.

(56) References Cited

U.S. PATENT DOCUMENTS

| | | | |
|---|---|---|---|
| 3,896,241 A * | 7/1975 | Malaspina et al. | 426/271 |
| 4,790,998 A | 12/1988 | Swartz | |
| 2003/0026845 A1 * | 2/2003 | Etzel et al. | 424/535 |
| 2003/0099753 A1 | 5/2003 | Yang | |
| 2004/0219273 A1 | 11/2004 | Cha | |
| 2006/0024412 A1 | 2/2006 | Cha | |

FOREIGN PATENT DOCUMENTS

| | | |
|---|---|---|
| DE | 3000951 | 7/1980 |
| DE | 10348539 | 5/2005 |
| FR | 2534455 | 4/1984 |

* cited by examiner

*Primary Examiner* — D. Lawrence Tarazano
*Assistant Examiner* — Hamid R Badr

(57) ABSTRACT

Embodiments of the invention relate to whey protein compositions that can be incorporated into food or beverage products that provide supplemental amounts of protein. The acidified whey protein compositions of the present invention may comprise a liquid whey protein and an acidulant. The liquid whey protein and the acidulant may be blended, and the resulting composition may then be co-dried. The acidulant may be present in an amount effective for reducing the pH of the composition prior to drying to a value less than about 6. Embodiments of the present invention also include methods of preparing co-dried acidified whey protein compositions exhibiting improved organoleptic characteristics.

2 Claims, 2 Drawing Sheets

ACIDIFIED WHEY PROTEIN COMPOSITIONS AND METHODS FOR MAKING THEM

FIELD OF THE INVENTION

Aspects of the present invention relate to compositions including acidified whey proteins that have desirable organoleptic and functional characteristics, methods for making such compositions, and nutritional products incorporating such acidified whey proteins.

BACKGROUND OF THE INVENTION

Protein is a nutritional component that consumers often seek in dietary supplements. Among the numerous sources of protein, whey proteins have a high nutritive value, due at least in part to the compositional profile of the proteins that includes a balanced array of amino acids. As a result, whey proteins are recognized as an important protein source, particularly for individuals who are health conscious and have specific dietary needs, such as athletes and body builders. Generally, it may be desirable to provide as much protein as possible from whey proteins in a nutritional supplement food or beverage product. Additionally, it is often desirable that a beverage product including whey proteins has a low pH for purposes of stability.

A conventional method for making an acidified whey protein composition includes dry blending an acid with whey proteins. In such a process, a whey protein first is isolated and then spray dried. This dried whey protein isolate is then dry blended with an acid. However, these dry-blended acidified whey proteins often suffer from disadvantages. For example, such dry-blended acidified whey proteins may not have desirable taste characteristics—they are generally too astringent and too tart. The pH of these dry-blended acidified whey proteins can only be lowered so far before the astringency and tartness problems become too great. Thus, there is a need for acidified whey protein compositions that have desirable flavor, odor, tartness, and sweetness characteristics at lower pH values, while still providing a desired amount of whey protein.

SUMMARY OF THE INVENTION

Embodiments of the invention relate methods of wet blending a whey protein product with an acid to provide a low pH whey protein composition that can then be dried. The dried compositions can then be used as a combined ingredient for use in the manufacture of food products, such as bars and beverages. The co-dried acidified whey protein combined compositions exhibit desirable organoleptic and functional characteristics, such as improved flavor, improved odor, improved tartness, and improved sweetness relative to acidified whey proteins prepared by conventional methods. Additionally, the co-dried acidified whey protein compositions may have lower pH values than acidified whey proteins prepared by conventional methods while still maintaining desirable taste properties and providing desirable amounts of whey protein.

In certain embodiments, the acidified whey protein compositions may include a liquid whey protein composition and an acidulant, which in certain embodiments is a food-grade acidulant. The liquid whey protein composition and the acidulant may be blended, and the resulting composition may then be dried using any known method, such as spray drying. The acidulant may be present in the liquid composition in an amount effective to reduce the pH of the composition prior to drying to a value of about 6 or less, such as between about 2.8 to about 5.6. Upon drying, the pH of the acidified whey protein composition is essentially maintained.

Aspects of the present invention also include methods of preparing co-dried acidified whey protein compositions. The co-dried acidified whey protein compositions may be prepared from a liquid whey protein solution. An acidulant may be mixed with the whey protein solution to provide an acidified liquid composition having a pH of about 6 or less. The acidified liquid composition may be dried to produce dried an acidified whey protein composition.

DETAILED DESCRIPTION OF THE EMBODIMENTS OF THE INVENTION

Figure 1:
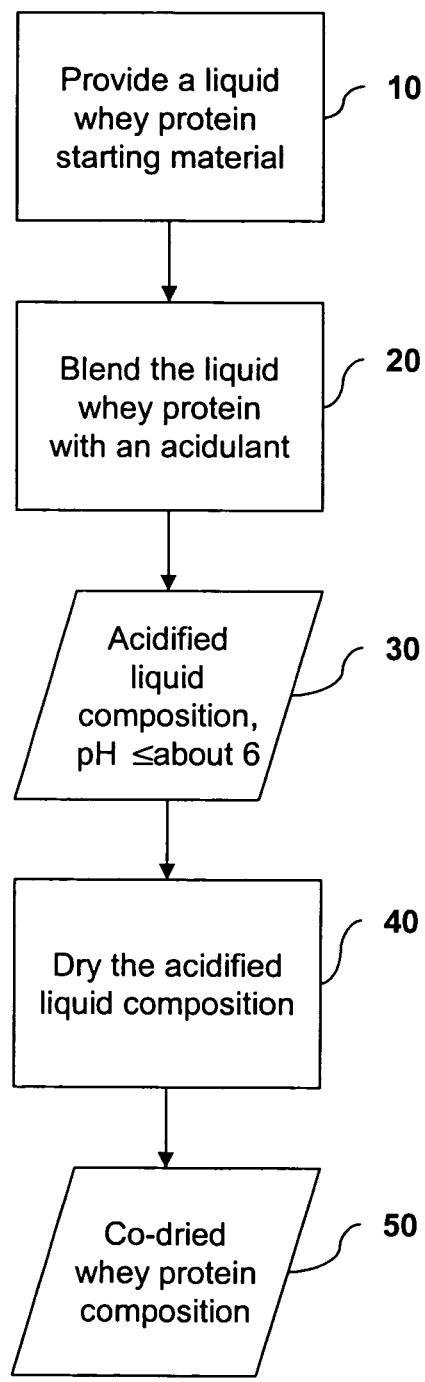
FIG. 1 is a block flow diagram showing a process for preparing a co-dried acidified whey protein composition in accordance with aspects of the present invention.

Aspects of the present invention relate to acidified whey protein compositions, particularly co-dried whey protein and acid compositions. The acidified whey protein compositions may be used to prepare food products, such as beverages, bars, and snacks, having desired organoleptic and functional characteristics. In certain embodiments, these acidified whey protein compositions may be incorporated as the primary or only source of protein in a food or beverage product. The compositions also can be used to prepare food or beverage products having increased protein content. The compositions may be used in food or beverage products with limited to no adverse affect on the organoleptic and functional properties of the finished food or beverage products. Methods of making the acidified whey protein compositions also are provided.

Aspects of the present invention include co-dried acidified whey protein compositions. In certain embodiments, the co-dried acidified whey protein composition is made from a blend that includes a liquid whey product and an acidulant.

In certain embodiments, the whey product includes a whey protein isolate, a whey protein concentrate, an intact whey protein, or combinations thereof. The whey protein may be present in an amount of at least about 80 wt %, at least about 85 wt %, at least about 90 wt %, or even greater than about 90 wt %, based on the weight of the whey product. The liquid whey product may contain other components such as lactose, minerals and lipids. The liquid whey product can be obtained or prepared using any method known to those of skill in the art.

Various acidulants may be used. Suitable acidulants include phosphoric acid, citric acid, phosphoric-citric acid (e.g., a combination of phosphoric acid and citric acid), malic acid, glucono-delta-lactone acid, hydrochloric acid, lactic acid, fumaric acid, tartaric acid, acetic acid, adipic acid, carbonic acid, and combinations thereof. Other acidulants known to those of skill in the art also may be used, such as any other food-grade acid.

The liquid whey protein compositions and the acidulant are blended prior to drying, such as by a spray drying process.

The acidulant or combination of acidulants may be blended in a single addition or in multiple additions to achieve the desired pH.

The acidulant is blended in an amount effective to reduce the pH of the whey protein composition to a value less than about 6 prior to spray drying of the composition. In certain embodiments, the acidulant is blended in an amount effective to reduce the pH of the composition to a value between about 2 and about 6, between about 2.8 and about 5.6, between about 3.3 and about 5.6, or to about 5.5. It may be desirable to decrease the pH just enough to improve the flavor of the final food or beverage product without reducing the protein level in the final product. For example, in certain embodiments, substantial improvement in flavor may be obtained by reducing the pH of the whey protein composition to a value of 5.5 while still providing at least about 80 wt %, even at least about 85 wt % or at least about 90 wt %, whey protein.

Aspects of the present invention also include methods of preparing an acidified whey protein composition. An exemplary embodiment of one such method is illustrated in FIG. 1. In step 10, a liquid whey protein solution is provided from any suitable whey product starting material. If the whey starting material is in powder form, it first may be hydrated with water. Additionally, the liquid whey solution may be filtered prior to its use in step 10 to separate the whey protein from other components such as fat, lactose, and minerals. In step 20, the liquid whey protein is blended with an acidulant. The blending may occur in any suitable receptacle, such as a tank. The blended liquid whey protein and acidulant provides an acidified liquid composition 30 having a pH of about 6 or less. In certain embodiments, the acidulant is titrated into the liquid whey protein in step 20. The acidulant is added in an amount effective to reduce the pH of the acidified liquid composition 30 to a desired value. The amount of acidulant blended will depend at least in part on the molecular weight of the specific acidulant used, the desired pH value, and the flavor of the resulting composition.

Various acidulants may be used in step 20. In certain embodiments, the acidulant is an acid including phosphoric acid, citric acid, phosphoric-citric acid (e.g., a combination of phosphoric acid and citric acid), malic acid, glucono-delta-lactone acid, hydrochloric acid, lactic acid, fumaric acid, tartaric acid, acetic acid, adipic acid, carbonic acid, and combinations thereof. Alternatively, other acidulants may be used in step 20, such as any food-grade acidulant. Additionally, stirring, agitation or other methods of mixing may be utilized in step 20 to promote blending of the whey protein composition and the acidulant.

In step 40, the acidified liquid composition 30 is dried to provide a dried whey protein composition 50. In certain embodiments, step 40 may be accomplished using any conventional spray-drying process known to those of skill in the art. As known to those of skill in the art, other methods of drying may also be used. In certain embodiments, the pH of the co-dried whey protein composition 50 may be further adjusted to a final pH.

In certain embodiments, step 40 is initiated promptly after step 20 to limit the degree of gelation, or thickening, of the acidified liquid composition 30. In other embodiments, the acidified liquid composition 30 is held for a time and at a temperature before drying. For example, the acidified liquid composition 30 may be refrigerated for a period of time, such as for twelve hours, to prevent microbial growth. The temperature of the refrigeration may be between about 5 and about 10° C., for example.

Without wishing to be bound by any theories, it is believed that the wet acidification of whey proteins and subsequent co-drying alters the structure of the whey proteins to provide an ingredient for use in food and beverage products that will have desirable organoleptic characteristics, such as improved flavor. Protein structure is dependent on a number of different variables, including pH. By adjusting the pH of a whey protein in accordance with the present invention, it is believed that drying the proteins at a lower pH provides a more stable protein structure and makes the protein more resistant to heat degradation of amino acids and release of sulfur compounds from the protein.

EXAMPLES

The following examples are intended to illustrate various embodiments of the invention and not to limit or otherwise restrict the invention.

Example 1

This example demonstrates an exemplary process for acidifying a whey protein isolate to provide an acidified whey protein powder that can be incorporated into solid and liquid food products.

Provon® 190 whey protein isolate, which is commercially available from Glanbia Nutritionals, Inc. of Twin Falls, Id., is used as the starting material. The pH of the Provon® 190 solution is reduced to a value of about 3.2 through the addition of an acid blend comprised of 60% phosphoric acid and 40% citric acid and containing 45% solids to provide an acidified liquid composition. One such acid blend is commercially available from Hydrite Chemical Co. of Brookfield, Wis. Alternatively, instead of an acid blend, the pH of the liquid Provon® 190 whey protein isolate first may be reduced to a value of about 4.5 by blending with citric acid, followed by a reduction to a pH value of about 3.2 by blending with phosphoric acid. The acidified liquid composition is spray dried, such as using a Niro Tall Form spray dryer from Niro Inc. of Hudson, Wis., to provide a co-dried whey protein composition.

Table 1 below illustrates the components and characteristics of the co-dried whey protein composition. All percentages are weight percent.

TABLE 1

|  | Mean |
| --- | --- |
| pH | 3.1 |
| Protein | 80.2% |
| Moisture | 0.7% |
| Lactose | 1.8% |
| Ash | 8.5% |
| Lipid | 0.6% |
| Calcium | 0.4% |
| Magnesium | 0.1% |
| Sodium | 0.2% |
| Potassium | 0.4% |
| Chloride | 0.1% |
| Phosphorous | 2.8% |

Example 2

A sensory analysis was performed using the co-dried whey protein composition prepared in accordance with Example 1. In this analysis, a protein beverage made with the co-dried whey protein composition of Example 1 was compared to a control beverage made with Provon® 190, which is commercially available from Glanbia Nutritionals, Inc. of Twin Falls, Id. Table 2 below shows the compositions of the two beverages. All percentages are weight percent.

TABLE 2

|  | Beverage with co-dried whey protein composition of Example 1 | Beverage with conventional whey protein composition (control) |
| --- | --- | --- |
| Whey protein | 7.8% | 7.0% |
| Water | 91.8% | 91.7% |
| Citric acid | 0.00% | 1.0% |
| Splenda ® sweetener, 25% solution | 0.1% | 0.1% |
| Flavor | 0.3% | 0.3% |
| Phosphoric acid | to pH = 2.8 | to pH = 2.8 |

The differences in the included amounts of whey protein, water and citric acid were necessary to equalize the amount of protein and to account for acid already present in the co-dried whey protein composition. The two beverages used in the analysis thus had the same final compositions of protein, acid, flavoring and sweetener.

In the sensory analysis, randomly numbered samples of the two high protein beverages made as described above were presented to 49 participants who had little exposure to the flavor of Provon® 190 whey protein. The participants were asked to express an overall preference between the two beverages. The participants also were asked to rate each beverage for flavor, odor, tartness, and sweetness on a scale of 0 to 9. The sensory analysis was designed to rank preferences. Thus, for example, a higher value for tartness indicates that the participant likes the tartness flavor, not that the participant considers the beverage to be highly tart.

Figure 2:
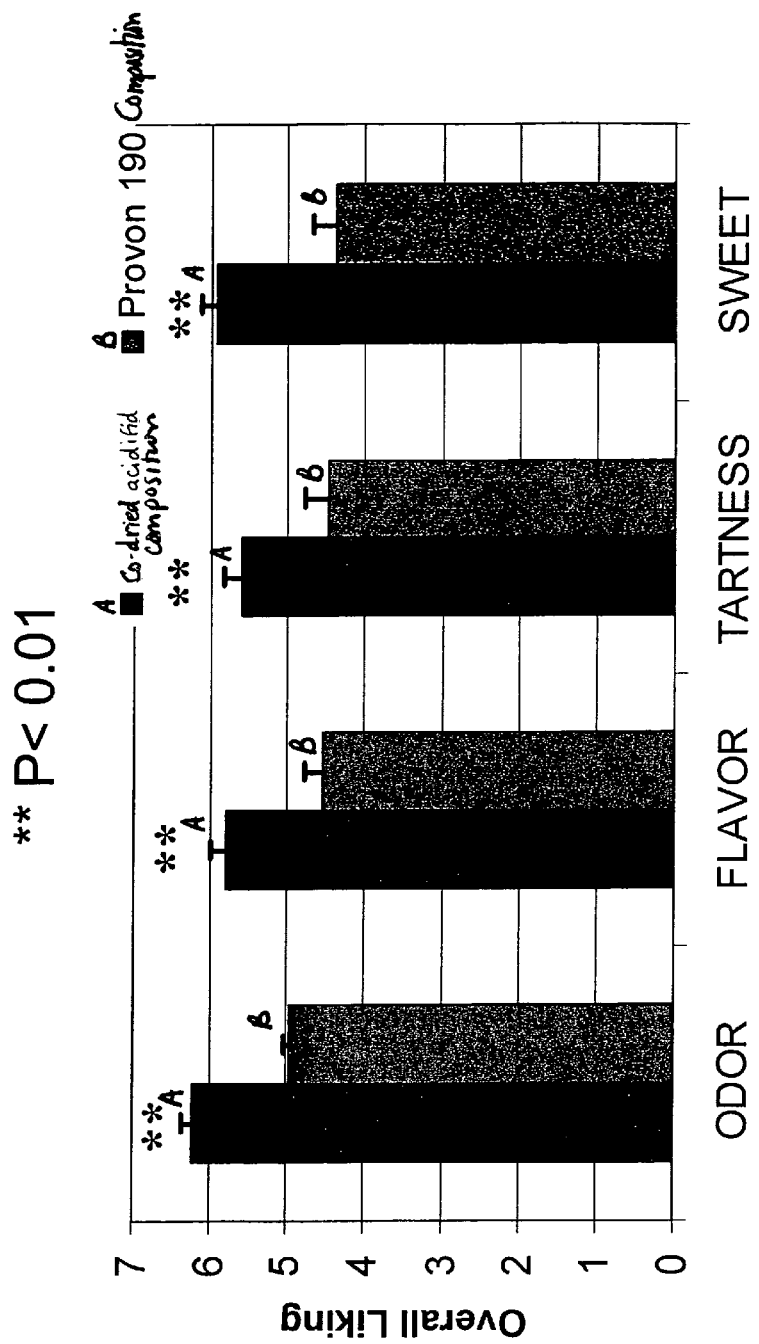
FIG. 2 is a graphical representation of the results of a sensory analysis comparing a beverage made with a co-dried acidified whey protein composition in accordance with aspects of the invention to a beverage made with a conventional whey protein composition.

The results of the sensory analysis were as follows. About 80% of the participants preferred the beverage prepared from the co-dried whey protein composition made in accordance with a method of the present invention. Additionally, the beverage prepared from the co-dried whey protein composition outperformed the control beverage prepared from Provon® 190 whey protein isolate in all the categories of flavor, odor, tartness, and sweetness. The beverage with the co-dried acidified whey protein composition of Example 1 was preferred by 80% of the participants. FIG. 2 presents a graphical summary of the results of the sensory analysis with respect to odor, flavor, tartness and sweetness.

Thus, the sensory analysis suggests that beverages prepared from a co-dried whey protein composition of the present invention are preferred by individuals more than beverages prepared from untreated whey protein and that beverages prepared from a co-dried whey protein composition exhibit improved flavor, odor, tartness, and sweetness.

Many modifications and variations may be made in the techniques and compositions described and illustrated herein without departing from the spirit and scope of the present invention, as will be apparent to persons of skill in the art after reading this specification. Accordingly, the techniques, compositions, and embodiments described and illustrated herein should be understood to be illustrative only and not limiting upon the scope of the present invention.

We claim:

1. A method for preparing a dried whey protein composition having improved flavor, the method consisting of
    a) preparing a liquid blend consisting of a whey product selected from the group consisting of whey protein isolate, whey protein concentrate, intact whey protein, and combinations thereof, and an acidulant to form an acidified whey product with a pH of less than or equal to about 6; and
    b) promptly drying the liquid blend.
2. The method of claim 1 wherein the acidulant is selected from the group consisting of phosphoric acid, citric acid, malic acid, glucono-delta-lactone, hydrochloric acid, lactic acid, fumaric acid, tartaric acid, acetic acid, adipic acid, carbonic acid, and combinations thereof.

\* \* \* \* \*